US012785592B2

(12) United States Patent
Azer

(10) Patent No.: US 12,785,592 B2
(45) Date of Patent: Nov. 3, 2026

(54) EFFICIENT TORQUE RIPPLE REDUCTION FOR SYNCHRONOUS ELECTRIC MOTORS IN ELECTRIC AND HYBRID-ELECTRIC VEHICLES

(71) Applicant: FCA US LLC, Auburn Hills, MI (US)

(72) Inventor: Peter Azer, Hamilton (CA)

(73) Assignee: FCA US LLC, Auburn Hills, MI (US)

( * ) Notice: Subject to any disclaimer, the term of this patent is extended or adjusted under 35 U.S.C. 154(b) by 253 days.

(21) Appl. No.: 18/619,501

(22) Filed: Mar. 28, 2024

(65) Prior Publication Data

US 2025/0309797 A1 Oct. 2, 2025

(51) Int. Cl.
*H02P 6/10* (2006.01)

(52) U.S. Cl.
CPC .................................... *H02P 6/10* (2013.01)

(58) Field of Classification Search
CPC .......... H02P 21/18; H02P 6/183; H02P 21/05; H02P 21/22; H02P 6/10; H02P 2207/05; H02P 25/022; H02P 25/22; B60K 6/445; B60W 10/08; B60W 20/00; Y02T 10/62; Y02T 10/64
See application file for complete search history.

(56) References Cited

U.S. PATENT DOCUMENTS 10,924,047 B2 2/2021 Suzuki et al.
2019/0081583 A1 3/2019 Xie
2021/0223295 A1 7/2021 Kang et al.
2022/0131490 A1 * 4/2022 Peddi ..................... H02P 23/30
2023/0378892 A1 11/2023 Sozer et al.

FOREIGN PATENT DOCUMENTS

CN 113809959 A * 12/2021 ............. B60L 15/20
CN 117092575 A 11/2023
WO 2023051623 A1 4/2023

OTHER PUBLICATIONS

"Liu, Di et al., Harmonic current injection method for inhibiting high-order noise of vehicle, Computer readable Storage Medium and Device, Dec. 17, 2021, Clarivate Analytics, pp. 1-19". (Year: 2021).*

* cited by examiner

*Primary Examiner* — Antony M Paul
(74) *Attorney, Agent, or Firm* — Jeremy J. Klobucar

(57) ABSTRACT

A torque ripple reduction method for a synchronous electric motor of a vehicle includes obtaining, by a control system, look-up tables (LUTs) that each include harmonic currents that satisfy a constrained objective function for phase current magnitude for the synchronous electric motor, based on a requested motor torque, determining, by the control system and using the LUTs, a plurality of currents including fundamental direct and quadrature currents and 6th order and 12th order harmonic quadrature currents, determining, by the control system, direct and quadrature voltages for the synchronous electric motor based on the plurality of currents including injection of the 6th and 12th order harmonic quadrature currents, and controlling, by the control system, the synchronous electric motor based on the determined direct and quadrature voltages to at least one of reduce torque ripples and increase efficiency of the synchronous electric motor.

16 Claims, 5 Drawing Sheets

EFFICIENT TORQUE RIPPLE REDUCTION FOR SYNCHRONOUS ELECTRIC MOTORS IN ELECTRIC AND HYBRID-ELECTRIC VEHICLES

FIELD

The present application generally relates to synchronous electric motors and, more particularly, to techniques for efficient torque ripple reduction for synchronous electric motors in electric and hybrid electric vehicles.

BACKGROUND

Electrified vehicle powertrains include one or more electric motors. One type of electric motor is a synchronous electric motor, in which a rotation of a shaft is synchronized with a frequency of the supply current. Synchronous electric motors can suffer from torque ripples, particularly at low-speed vehicle operating conditions. In some cases, these torque ripples could cause shaking or vibration (noise/vibration/harshness, or NVH) that could be noticeable by a driver of the vehicle. Conventional solutions to this problem include costly mechanical redesigns and harmonic current injection. Conventional harmonic current injection techniques do not consider (i) motor efficiency or (ii) direct current (DC) link voltage (i.e., inverter DC input voltage) limitations, and also do not define how much reduction in torque ripple harmonics is required. Accordingly, while such conventional synchronous electric motor systems do work for their intended purpose, there exists an opportunity for improvement in the relevant art.

SUMMARY

According to one example aspect of the invention, a torque ripple reduction system for an electrified powertrain of a vehicle is presented. In one exemplary implementation, the torque ripple reduction system comprises a synchronous electric motor and a control system configured to obtain look-up tables (LUTs) that each include harmonic currents that satisfy a constrained objective function for phase current magnitude for the synchronous electric motor, based on a requested motor torque, determine, using the LUTs, a plurality of currents including fundamental direct and quadrature currents and $6^{th}$ order and $12^{th}$ order harmonic quadrature currents, determine direct and quadrature voltages for the synchronous electric motor based on the plurality of currents including injection of the $6^{th}$ and $12^{th}$ order harmonic quadrature currents, and control the synchronous electric motor based on the determined direct and quadrature voltages to at least one of reduce torque ripples and increase efficiency of the synchronous electric motor.

In some implementations, the torque ripple reduction system further comprises an optimized system configured to determine the objective function and a set of constraints for the objective function and generate the LUTs by optimizing the objective function subject to the set of constraints. In some implementations, the objective function is defined as:

$$I_m = \sqrt{i_{do}^2 + i_{qo}^2 + i_{q6a}^2 + i_{q6b}^2 + i_{q12a}^2 + i_{q12b}^2},$$

where $I_m$ represents the phase current magnitude, $i_{do}$ and $i_{qo}$ represent the fundamental direct and quadrature currents, respectively, $i_{q6a}$ and $i_{q6b}$ represent cosine and sine Fourier coefficients, respectively, of the $6^{th}$ order harmonic quadrature current, and $i_{q12a}$ and $i_{q12b}$ represent cosine and sine Fourier coefficients, respectively, of the $12^{th}$ order harmonic quadrature current.

In some implementations the set of constraints include:

$$I_m \le I_{rated},$$

$$V_m \le V_{DC}/\sqrt{3},$$

$$T_{e,6} \le T_{6,thres}$$

and $$T_{e,12} \le T_{12,thres},$$

and $$T_{e,avg} = T_{o,req},$$

where $I_{rated}$ represents a rated phase current of the synchronous electric motor, $V_m$ represents a phase voltage magnitude relative to a direct current (DC) link or input voltage $V_{DC}$, $T_{e,6}$, and $T_{e,12}$ are $6^{th}$ order and $12^{th}$ order torque harmonic magnitudes relative to $6^{th}$ and $12^{th}$ order threshold torque harmonic magnitudes $T_{6,th}$ and $T_{12,th}$, and $T_{e,avg}$ is an average dynamic torque relative to a requested average torque $T_{o,req}$. In some implementations, the optimized system is further configured to define a speed range for the synchronous electric motor in which torque ripple reduction is required and, based on the defined speed range, determine a speed/torque transfer function for the synchronous electric motor that is utilized to determine the threshold torque harmonic magnitudes.

In some implementations, the speed/torque transfer function H(s) is defined as:

$$H(s) = \frac{1/j}{(s + \beta/j)},$$

where j represents a moment of inertia of the synchronous electric motor, β represents a friction coefficient of the synchronous electric motor. In some implementations, $6^{th}$ and $12^{th}$ speed harmonics are assumed to equally contribute to root-mean-square (RMS) speed harmonics ($\omega_{rms}$), and wherein the $6^{th}$ and $12^{th}$ order threshold torque harmonic magnitudes $T_{6,thres}$ and $T_{12,thres}$ are calculated as follows to always keep the RMS of a speed ripple ($\Delta\omega_{rms}$) less than 5% of the average angular speed ($\omega_{avg}$):

$$\Delta\omega_{rms} = \sqrt{\omega_6^2 + \omega_{12}^2} = \sqrt{2\omega_h^2} = \sqrt{2}\,\omega_h < 0.05\omega_{avg},$$

where $$\omega_{avg} = \frac{2\pi n_{rpm}}{60},$$

$$\omega_n = 0.035\frac{2\pi n_{rpm}}{60},$$

$$T_h = \omega_n\sqrt{(j2\pi f_h)^2 + \beta^2},$$

$$T_{6,thres} = 0.035\frac{2\pi n_{rpm}}{60}\sqrt{\left(j2\pi\frac{6Pn_{rpm}}{60}\right)^2 + \beta^2},$$

and $$T_{12,thres} = 0.035\frac{2\pi n_{rpm}}{60}\sqrt{\left(j2\pi\frac{12Pn_{rpm}}{60}\right)^2 + \beta^2},$$

where $n_{rpm}$ is a motor speed in revolution per minute and (P) is a pole pair of a synchronous electric motor.

In some implementations, the LUTs are two-dimensional (2D) LUTs that define the harmonic currents as a function of motor speed and requested motor torque. In some implementations, the control system is configured to utilize a current regulator to determine the direct and quadrature voltages for the synchronous electric motor based on the plurality of currents.

According to another example aspect of the invention, a torque ripple reduction method for a synchronous electric motor of a vehicle is presented. In one exemplary implementation, the torque ripple reduction method comprises obtaining, by a control system, LUTs that each include harmonic currents that satisfy a constrained objective function for phase current magnitude for the synchronous electric motor, based on a requested motor torque, determining, by the control system and using the LUTs, a plurality of currents including fundamental direct and quadrature currents and $6^{th}$ order and $12^{th}$ order harmonic quadrature currents, determining, by the control system, direct and quadrature voltages for the synchronous electric motor based on the plurality of currents including injection of the $6^{th}$ and $12^{th}$ order harmonic quadrature currents, and controlling, by the control system, the synchronous electric motor based on the determined direct and quadrature voltages to at least one of reduce torque ripples and increase efficiency of the synchronous electric motor.

In some implementations, the torque ripple reduction method further comprises determining, by an optimized system, the objective function and a set of constraints for the objective function and generating, by the optimized system, the LUTs by optimizing the objective function subject to the set of constraints. In some implementations, the objective function is defined as:

$$I_m = \sqrt{i_{do}^2 + i_{qo}^2 + i_{q6a}^2 + i_{q6b}^2 + i_{q12a}^2 + i_{q12b}^2},$$

where $I_m$ represents the phase current magnitude, $i_{do}$ and $i_{qo}$ represent the fundamental direct and quadrature currents, respectively, $i_{q6a}$ and $i_{q6b}$ represent cosine and sine Fourier coefficients, respectively, of the $6^{th}$ order harmonic quadrature current, and $i_{q12a}$ and $i_{q12b}$ represent cosine and sine Fourier coefficients, respectively, of the $12^{th}$ order harmonic quadrature current.

In some implementations, the set of constraints include:

$$I_m \leq I_{rated},$$

$$V_m \leq V_{DC}/\sqrt{3},$$

$$T_{e,6} \leq T_{6,thres}$$

and $$T_{e,12} \leq T_{12,thres},$$

and $$T_{e,avg} = T_{o,req},$$

where $I_{rated}$ represents a rated phase current of the synchronous electric motor, $V_m$ represents a phase voltage magnitude relative to a DC link or input voltage $V_{DC}$, $T_{e,6}$, and $T_{e,12}$ are $6^{th}$ order and $12^{th}$ order torque harmonic magnitudes relative to $6^{th}$ and $12^{th}$ order threshold torque harmonic magnitudes $T_{6,th}$ and $T_{12,th}$, and $T_{e,avg}$ is an average dynamic torque relative to a requested average torque $T_{o,req}$. In some implementations, the torque ripple reduction method further comprises defining, by the optimized system, a speed range for the synchronous electric motor in which torque ripple reduction is required and, based on the defined speed range, determining, by the optimized system, a speed/torque transfer function for the synchronous electric motor that is utilized to determine the threshold torque harmonic magnitudes.

In some implementations, the speed/torque transfer function H(s) is defined as:

$$H(s) = \frac{1/j}{(s + \beta/j)},$$

where j represents a moment of inertia of the synchronous electric motor, β represents a friction coefficient of the synchronous electric motor. In some implementations, $6^{th}$ and $12^{th}$ speed harmonics are assumed to equally contribute to RMS speed harmonics ($\omega_{rms}$), and wherein the $6^{th}$ and $12^{th}$ order threshold torque harmonic magnitudes $T_{6,thres}$ and $T_{12,thres}$ are calculated as follows to always keep the RMS of a speed ripple ($\Delta\omega_{rms}$) less than 5% of the average angular speed ($\omega_{avg}$):

$$\Delta\omega_{rms} = \sqrt{\omega_6^2 + \omega_{12}^2} = \sqrt{2\omega_h^2} = \sqrt{2}\,\omega_h < 0.05\omega_{avg},$$

where $$\omega_{avg} = \frac{2\pi n_{rpm}}{60},$$

$$\omega_n = 0.035\frac{2\pi n_{rpm}}{60},$$

$$T_h = \omega_n\sqrt{(j2\pi f_h)^2 + \beta^2},$$

$$T_{6,thres} = 0.035\frac{2\pi n_{rpm}}{60}\sqrt{\left(j2\pi\frac{6Pn_{rpm}}{60}\right)^2 + \beta^2},$$

and $$T_{12,thres} = 0.035\frac{2\pi n_{rpm}}{60}\sqrt{\left(j2\pi\frac{12Pn_{rpm}}{60}\right)^2 + \beta^2},$$

where $n_{rpm}$ is a motor speed in revolution per minute and (P) is a pole pair of a synchronous electric motor.

In some implementations, the LUTs are 2D LUTs that define the harmonic currents as a function of motor speed and requested motor torque. In some implementations, the torque reduction method further comprises utilizing, by the control system, a current regulator to determine the direct and quadrature voltages for the synchronous electric motor based on the plurality of currents.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, one type of electric motor utilized in vehicle electrified powertrains is a synchronous electric motor. Synchronous electric motors can suffer from torque ripples, particularly at low-speed vehicle operating conditions. In some cases, these torque ripples could cause shaking or vibration (noise/vibration/harshness, or NVH) that could be noticeable by a driver of a vehicle. Harmonic current injection is the most widely-accepted technique for reducing torque ripples, as these torque ripples correspond to phase current harmonics. Conventional harmonic current injection techniques do not consider (i) motor efficiency or (ii) direct current (DC) link voltage (i.e., inverter DC input voltage) limitations, and do not define how much reduction in torque ripple harmonics is required. Accordingly, improved synchronous electric motor control techniques are presented herein that reduce or mitigate torque ripples while also optimizing or maximizing motor efficiency. These techniques determine an objective function based on phase current magnitude and constrained by torque ripple harmonic magnitudes (calculated based on a speed/torque motor transfer function), rated phase current, and DC link voltage.

By including the phase current magnitude in the objective function, we ensure that the motor efficiency is the most efficient. In addition, defining threshold torque ripple harmonic magnitudes ensures that the maximum efficiency is always targeted instead of absolute reduction in torque ripple harmonics where it might not be needed. An example optimization logic or architecture according to the principles of the present application can be generally divided into three phases: (1) define the speed range where torque ripple reduction is required and calculate the threshold values of torque harmonic (e.g., the $6^{th}$ and $12^{th}$ harmonic orders) magnitudes, (2) find the optimum harmonic reference currents that will be injected to reduce torque harmonics, and (3) a current regulator to control the harmonic currents. Potential benefits of the techniques of the present application include improved vehicle drivability and efficiency without any increased costs. For example only, the techniques of the present application are capable of achieving a 67% reduction in torque ripple with only a 7% increase in current magnitude and without exceeding the DC link voltage limit unlike the other methods that do not consider the percentage increase of current magnitude or the limitation of the DC link voltage.

Figure 1:
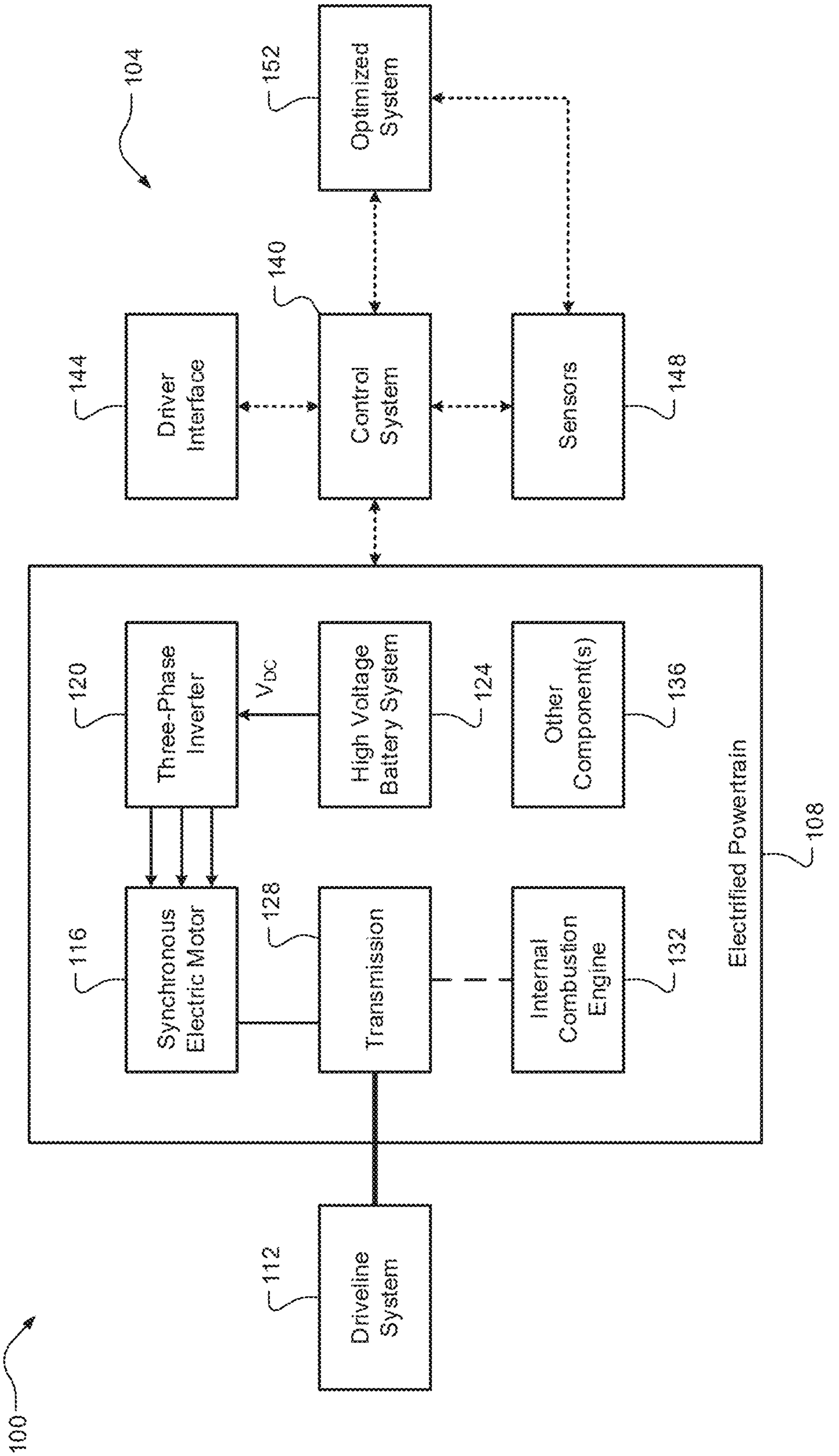
FIG. 1 is a functional block diagram of a vehicle having an example torque ripple reduction system for a synchronous electric motor according to the principles of the present application.

Referring now to FIG. 1, a functional block diagram of a vehicle 100 having an example torque ripple reduction system 104 for an electrified powertrain according to the principles of the present application is illustrated. The vehicle 100 generally comprises the electrified powertrain 108, which is configured to generate and transfer drive torque to a driveline system 112 for propulsion of the vehicle 100. The electrified powertrain 108 includes a synchronous electric motor 116 (also "electric motor 116" herein), a three-phase inverter 120, a high voltage battery pack or system 124, a transmission 128 (e.g., a multi-speed automatic transmission), and an optional internal combustion engine 132. While a single electric motor 116 is shown and described herein, it will be appreciated that the electrified powertrain 108 could include multiple electric motors 116 (e.g., one for each of a front and rear axle of the driveline system 112) and/or other types of electric motors, such as a motor-generator unit (MGU) connected to the engine 132. The electrified powertrain 108 could also include other components 136, such as, but not limited to, a low voltage battery system and a DC-DC converter.

A controller or control system 140 controls operation of the vehicle 100, including primarily controlling the electrified powertrain 108 to generate and transfer a desired amount of drive torque to the driveline system 112 to satisfy a driver torque request, which could be received via a driver interface 144 (e.g., an accelerator pedal). The control system 140 is also configured to control the electric motor 116 and, if applicable, the engine 132 such that the desired amount of drive torque is collectively generated. The control system 140 receives measurements from a set of sensors 148, which are configured to measure or monitor various operating parameters of the vehicle 100 (speeds, torques, temperatures, pressures, etc.). An optimized system 152 could also be configured to perform at least a portion of the techniques of the present application and to communicate with the control system 140 (e.g., to upload optimized values thereto). The control system 140 is also configured to perform at least a portion of the techniques of the present application, i.e., controlling the harmonic current injection.

Figure 2:
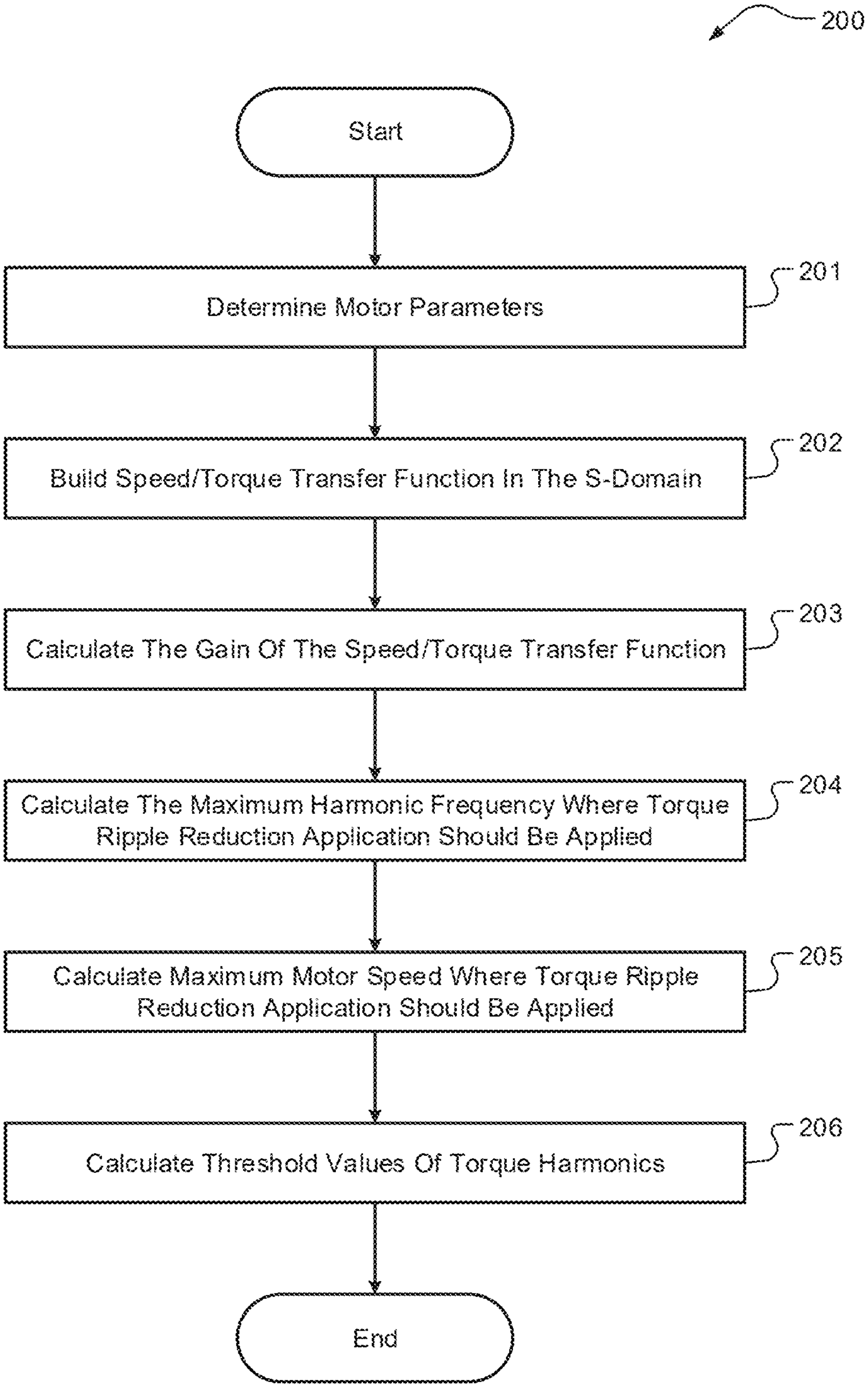
FIG. 2 is a flow diagram of determination of the threshold torque ripple harmonic values as a function of a synchronous motor speed where the principles of the present application should be applied.

Referring now to FIG. 2, a flow diagram of a method 200 for the determination of the threshold torque ripple harmonic values for a synchronous electric motor where the principles of the present application should be applied is illustrated. The method 200 consists of six phases or steps. In the first step 201, the parameters of a synchronous motor 116 is determined. This includes motor moment of inertia (j) and friction coefficient (β). The second step 202 builds the transfer function of speed/torque as:

$$T_e - T_L = j\frac{d\omega}{dt} + \beta\omega, \quad (1)$$

where $T_L$ and $T_e$ represent load and motor electromagnetic torques, respectively, and ω is the angular speed. The load torque can be considered as a disturbance and be neglected. The $h^{th}$ angular speed harmonic magnitude ($\omega_h$) due to a given $h^{th}$ torque harmonic ($T_h$) can be formulated as follows:

$$T_h = j\frac{d\omega_h}{dt} + \beta\omega_h. \quad (2)$$

By applying Laplace transform (S), equation (2) can be formulated as:

$$T_h - jS\omega_h + \beta\omega_h = \omega_h(jS + \beta). \quad (3)$$

In the third step 203, the gain (A) of the speed/torque transfer function is calculated.

This is done by replacing the Laplace transform (S) by ($2\pi f_h i$) as follows:

$$T_h = \omega_h(j2\pi f_h i + \beta), \quad (4)$$

$$|T_h| = |\omega_h|\sqrt{(j2\pi f_h)^2 + \beta^2}, \quad (5)$$

$$\left|\frac{\omega_h}{T_h}\right| = \frac{1}{\sqrt{(j2\pi f_h)^2 + \beta^2}}, \text{ and} \quad (6)$$

$$A = \frac{1}{\sqrt{(j2\pi f_h)^2 + \beta^2}}, \quad (7)$$

where $f_h$ is a frequency of the $h^{th}$ harmonic angular speed and i is the imaginary unit that $i^2=-1$. Equation (7) shows the gain of an angular speed harmonic ($\omega_h$) due to a torque harmonic ($T_h$). In a fourth step 204, the maximum harmonic frequency where torque ripple reduction should be applied ($f_{h,cutoff}$) is obtained. This happens when the gain (A) equals to 0.7078 which is equivalent to −3 dB:

$$0.7078 = \frac{1}{\sqrt{(j2\pi f_{h,cutoff})^2 + \beta^2}}, \text{ and} \quad (8)$$

$$f_{h,cutoff} = \frac{\sqrt{(1/0.7078)^2 - \beta^2}}{j2\pi}. \quad (9)$$

Equation (9) shows that torque ripple reduction is required as long as a harmonic frequency is less than the cutoff frequency ($f_{h,cutoff}$). Since the speed/torque transfer function in (3) acts as a low-pass filter, the dominant angular speed harmonics correspond to the lowest orders, such as the $6^{th}$ and $12^{th}$ harmonic electrical orders, or their mechanical counterparts obtained by multiplying them by a pole pair (P) of a synchronous electric motor 116. In a fifth step 205, the maximum revolution per minute ($n_{rpm,cutoff}$) where the torque ripple reduction should be applied can be calculated as:

$$n_{rpm,cutoff} = \frac{60\, f_{h,cutoff}}{6P}. \quad (10)$$

The root-mean-square (RMS) of the speed ripple can be considered due to the $6^{th}$ and $12^{th}$ electrical harmonic orders, or their mechanical counterparts obtained by multiplying them by a pole pair (P) of a synchronous electric motor 116. If the $6^{th}$ and $12^{th}$ speed harmonics are assumed to be equally contributing to the RMS of speed ripple, the threshold values of the $6^{th}$ and $12^{th}$ torque harmonics as a function of an average angular speed ($\omega_{avg}$) can be calculated using equations (15) and (16) below and they represent the last or sixth step 206. These torque threshold values ($T_{6,thres}$, $T_{12,thres}$) are the threshold values to always keep the RMS of the speed ripple at less than 5% of an average angular speed ($\omega_{avg}$):

$$\Delta\omega_{rms} = \sqrt{\omega_{6P}^2 + \omega_{12P}^2} = \sqrt{2\omega_h^2} = \sqrt{2}\,\omega_h = 0.05\omega_{avg}, \quad (11)$$

$$\text{where } \omega_{avg} = \frac{2\pi n_{rpm}}{60}, \quad (12)$$

$$\omega_h = 0.035\frac{2\pi n_{rpm}}{60}, \quad (13)$$

$$T_h = 0.035\frac{2\pi n_{rpm}}{60}\sqrt{(j2\pi f_h)^2 + \beta^2}, \quad (14)$$

$$T_{6,thres} = 0.035\frac{2\pi n_{rpm}}{60}\sqrt{\left(j2\pi\frac{6Pn_{rpm}}{60}\right)^2 + \beta^2}, \text{ and} \quad (15)$$

$$T_{12,thres} = 0.035\frac{2\pi n_{rpm}}{60}\sqrt{\left(j2\pi\frac{12Pn_{rpm}}{60}\right)^2 + \beta^2}. \quad (16)$$

Figure 3:
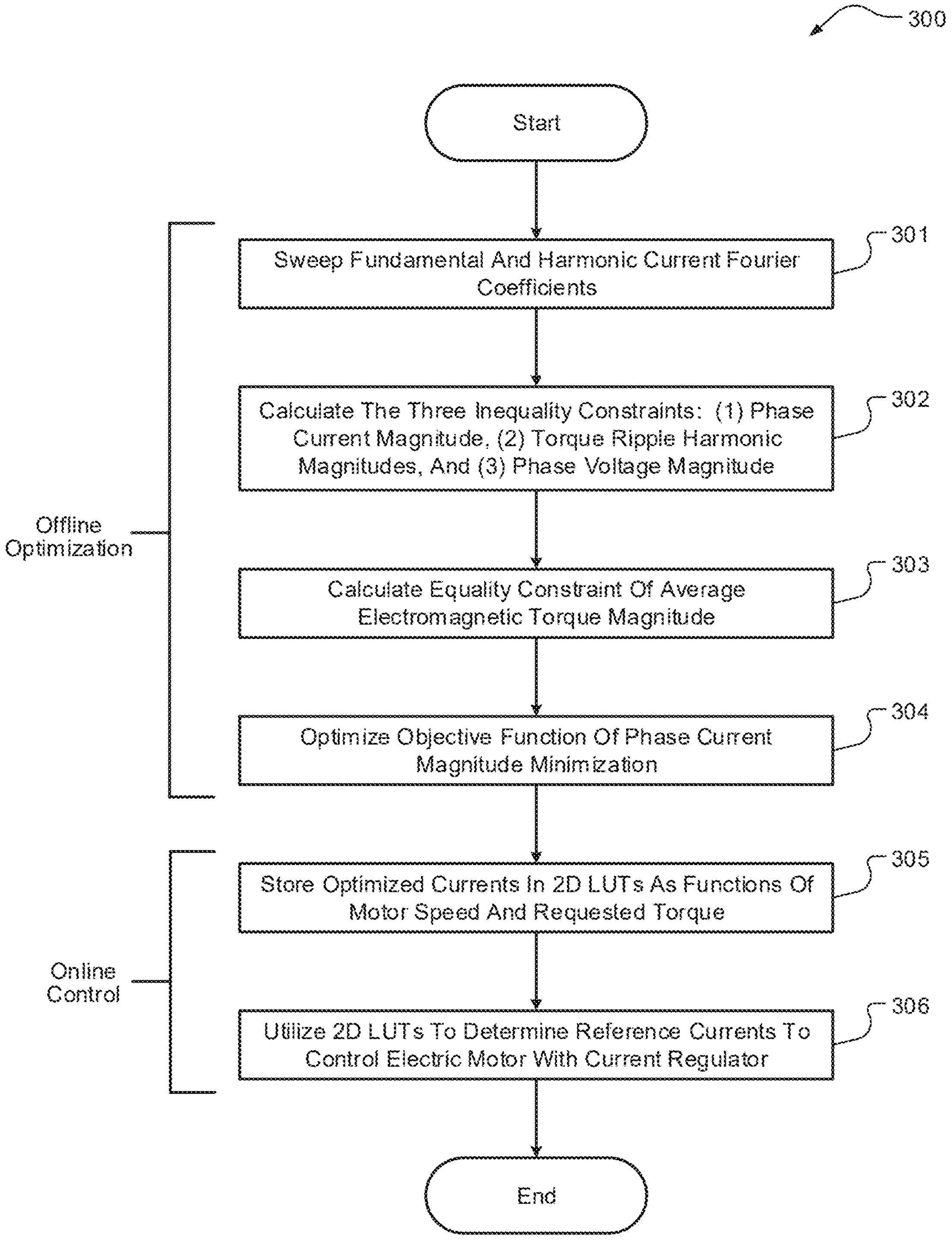
FIG. 3 is a flow diagram describing the optimization logic of an example torque ripple reduction method for synchronous electric motor of a vehicle according to the principles of the present application.

Referring now to FIG. 3, a flow diagram of the optimization logic 300 is shown and explained below. For a given requested torque ($T_{o,req}$) and motor speed in revolution per minute ($n_{rpm}$), first, the fundamental and harmonic currents are defined in 301, then three inequality constraints are calculated in 302 which are: (1) the phase current magnitude ($I_m$) is less than a rated phase current value ($I_{rated}$) of the electric motor 116, (2) the harmonic torque magnitudes ($T_{e,6}$, $T_{e,12}$) are less than or equal to respective threshold values ($T_{e,6th}$, $T_{e,12th}$) as described above, (3) a phase voltage ($V_m$) is less than or equal to [$V_{DC}/\sqrt{3}$]. In addition to an equality constraint in 303 which is the average electromagnetic torque ($T_{e,avg}$) is equal to the requested average torque ($T_o$).

The objective function is optimized which is the minimization of the phase current magnitude in 304. The outputs of the optimization process are the optimum phase and harmonic currents that can reduce torque ripple while achieving high efficiency without exceeding the DC link voltage.

Figure 4:
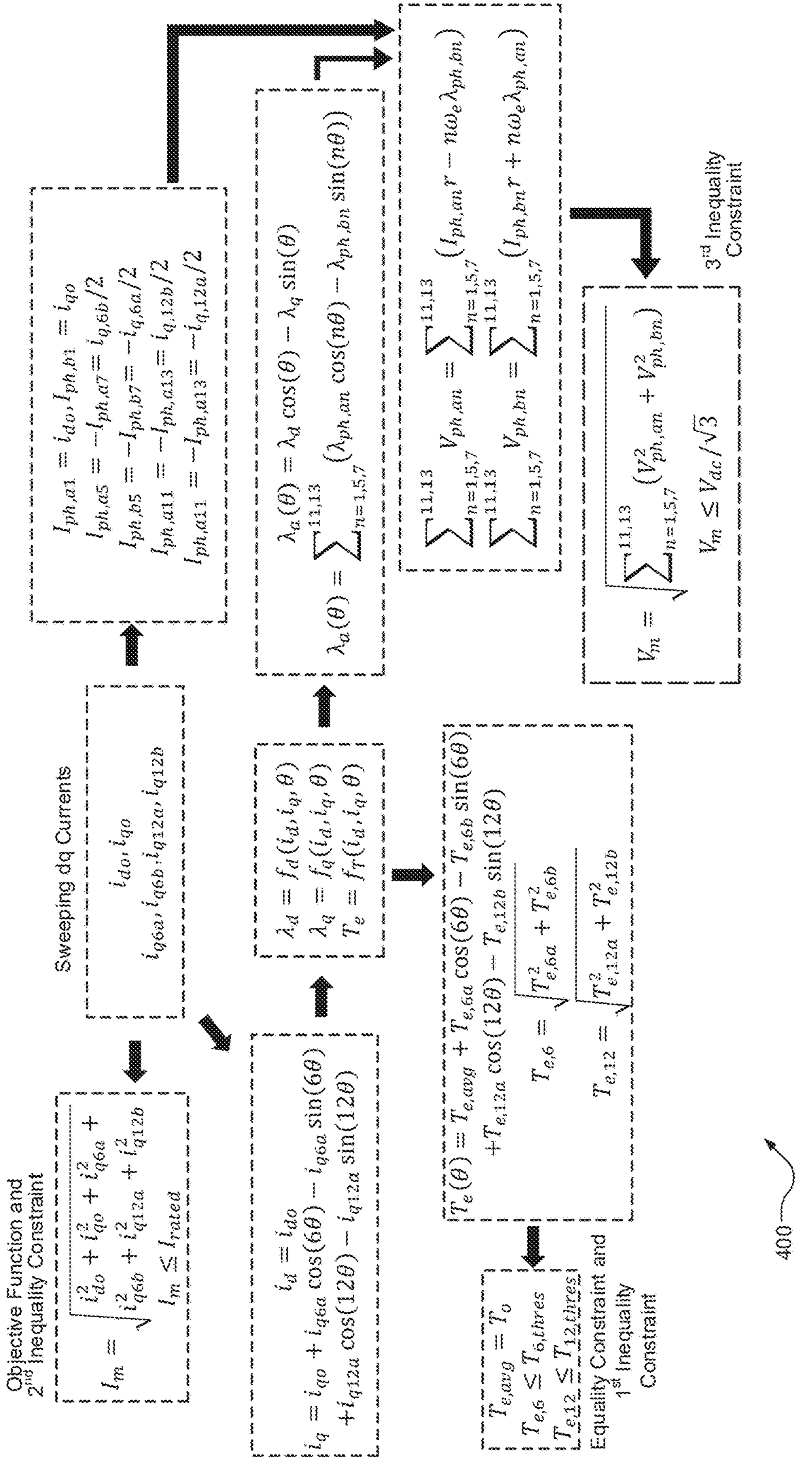
FIG. 4 is a functional block diagram showing the detailed calculations required for an example optimization logic or architecture according to the principles of the present application.

FIG. 4 is a functional block diagram 400 showing the detailed calculation of the four constraints and the objective function for the optimization logic 300 shown in FIG. 3 and explained herein. As previously mentioned, the objective function is the phase current magnitude, which is represented by the fundamental current, the $6^{th}$ and $12^{th}$ quadrature axis currents. Thus, the objective function could be represented as follows:

$$OBJ{:}I_m = \sqrt{i_{do}^2 + i_{qo}^2 + i_{q6a}^2 + i_{q12a}^2 + i_{q12b}^2}, \quad (17)$$

where $i_{do}$ and $i_{qo}$ represent the fundamental direct and quadrature currents, respectively, $i_{q6a}$ and $i_{q6b}$ represent the cosine and sine Fourier coefficients, respectively, of the $6^{th}$ order harmonic quadrature (q-axis) current, and $i_{q12a}$ and $i_{q12b}$ represent the cosine and sine Fourier coefficients, respectively, of the $12^{th}$ order harmonic quadrature (q-axis) current. Additionally, the phase current magnitude should be less than the rated current which is the first inequality constraint in 302:

$$I_m \le I_{rated}. \quad (18)$$

Next is the calculation of the second inequality constraint which is related to the threshold torque ripple harmonics 206 and the equality constraint which is related to average torque magnitude 303. This is done by calculating the dynamic d-q currents as a function of rotor position (θ) as:

$$i_d(\theta) = i_{do}, \text{ and} \tag{19}$$

$$i_q(\theta) = i_{qo} + i_{q,6a}\cos(6\theta) - i_{q,6b}\sin(6\theta) + i_{q,12a}\cos(12\theta) - i_{q,12b}\sin(12\theta). \tag{20}$$

Next, the dynamic torque profile is calculated:

$$T_e = f_T(i_d, i_q, \theta), \tag{21}$$

where $f_T(i_d, i_q, \theta)$ is a three-dimensional (3D) LUT describes the electromagnetic torque as a function of d-q currents and rotor position. $f_T(i_d, i_q, \theta)$ can be obtained from finite element method (FEM) simulations or explicitly by using a dynamometer. Next, the harmonic Fourier coefficients of dynamic torque are calculated:

$$T_e(\theta) = T_{e,avg} + T_{e,6a}\cos(6\theta) - T_{e,6b}\sin(6\theta) + T_{e,12a}\cos(12\theta) - T_{e,12b}\sin(12\theta). \tag{22}$$

Finally, the equality constraint 303 is checked to ensure the average electromagnetic torque is equal to the requested torque as:

$$T_{e,avg} = T_{o,reg}. \tag{23}$$

The second inequality constraint 302 is to ensure that the $6^{th}$ and $12^{th}$ torque ripple harmonics are less than the threshold values defined in 206 as follows:

$$T_{e,6} = \sqrt{T_{e,6a}^2 + T_{e,6b}^2}, \tag{24}$$

$$T_{e,12} = \sqrt{T_{e,12a}^2 + T_{e,12b}^2}, \tag{25}$$

$$T_{e,6} \le T_{6,thres}, \text{ and} \tag{26}$$

$$T_{e,12} \le T_{12,thres}. \tag{27}$$

The last inequality constraint is related to the phase voltage to check that it satisfies a voltage limitation of $V_m$ is less than $[V_{DC}/\sqrt{3}]$. In one exemplary implementation, this calculation is performed as follows. Initially, the dynamic d-q currents are calculated:

$$i_d(\theta) = i_{do}, \text{ and} \tag{28}$$

$$i_q(\theta) = i_{qo} + i_{q,6a}\cos(6\theta) - i_{q,6b}\sin(6\theta) + i_{q,12a}\cos(12\theta) - i_{q,12b}\sin(12\theta). \tag{29}$$

Next, the dynamic d-q flux linkages ($\lambda_d$ and $\lambda_q$) are calculated using flux linkage three-dimensional (3D) lookup tables (LUTs), represented by $f_d(i_d, i_q, \theta)$ and $f_q(i_d, i_q, \theta)$ and can be obtained from finite element method (FEM) simulations or explicitly by using a dynamometer:

$$\lambda_d = f_d(i_d, i_q, \theta), \text{ and} \tag{30}$$

$$\lambda_q = f_q(i_d, i_q, \theta). \tag{31}$$

Next, the dynamic d-q flux linkage is converted into phase flux linkage using an inverse Park-Clark transformation:

$$\lambda_a(\theta) = \lambda_d\cos(\theta) - \lambda_q\sin(\theta). \tag{32}$$

Next, the harmonic Fourier coefficients of the phase flux linkage are calculated:

$$\lambda_a(\theta) = \sum_{n=1,5,7}^{11,13}(\lambda_{ph,an}\cos(n\theta) - \lambda_{ph,bn}\sin(n\theta)). \tag{33}$$

where $\lambda_{ph,an}$ and $\lambda_{ph,bn}$ are the cosine and sine Fourier coefficients of the phase flux linkage, respectively. Next, the Fourier coefficients of phase current are converted from the d-q coordinate space to the a-b-c coordinate space:

$$I_{ph,a1} = i_{do}, I_{ph,b1} = i_{qo}, \tag{34}$$

$$I_{ph,a5} = -I_{ph,a7} = i_{q,6b}/2, \tag{35}$$

$$I_{ph,b5} = -I_{ph,b7} = -i_{q,6a}/2, \tag{36}$$

$$I_{ph,a11} = -I_{ph,a13} = i_{q,12b}/2, \text{ and} \tag{37}$$

$$I_{ph,a11} = -I_{ph,a13} = -i_{q,12a}/2, \tag{38}$$

where $I_{ph,an}$ and $I_{ph,bn}$ are the cosine and sine Fourier coefficients of the phase current, respectively. Next, the phase voltage harmonic Fourier coefficients are calculated:

$$\sum_{n=1,5,7}^{11,13} V_{ph,bn} = \sum_{n=1,5,7}^{11,13}(I_{ph,bn}r - n\omega_e\lambda_{ph,an}), \tag{39}$$

$$\sum_{n=1,5,7}^{11,13} V_{ph,bn} = \sum_{n=1,5,7}^{11,13}(I_{ph,bn}r + n\omega_e\lambda_{ph,an}), \text{ and} \tag{40}$$

$$\omega_e = \frac{2\pi P n_{rpm}}{60}, \tag{41}$$

where $V_{ph,an}$ and $V_{ph,bn}$ are the cosine and sine Fourier coefficients of the phase voltage, respectively, and $\omega_e$ is the angular frequency. Finally, the voltage limitation is checked representing the last inequality constraint in 302:

$$V_m = \sqrt{\sum_{n=1,5,7}^{11,13}\left(V_{ph,an}^2 + V_{ph,bn}^2\right)} \le V_{DC}/\sqrt{3}. \tag{42}$$

The previously discussed 3D LUTs of torque and flux linkage could be obtained either from finite element analysis (FEA) simulations or experimentally, such as using locked rotor tests:

$$\lambda_d = f_d(i_d, i_q, \theta), \tag{43}$$

$$\lambda_q = f_q(i_d, i_q, \theta), \text{ and} \tag{44}$$

$$T_e = f_T(i_d, i_q, \theta). \tag{45}$$

After obtaining the currents that satisfy the optimization logic (e.g., FIG. 3), the optimized fundamental and harmonic currents are saved in block 305 as in two-dimensional (2D) LUTs as functions of motor speed and requested motor torque:

$$i_{do,ref} = f_{do}(T_{o,req}, n_{rpm}), \tag{46}$$

$$i_{qo,ref} = f_{qo}(T_{o,req}, n_{rpm}), \tag{47}$$

$$i_{q6a,ref} = f_{q6a}(T_{o,req}, n_{rpm}), \tag{48}$$

$$i_{q6b,ref} = f_{q6b}(T_{o,req}, n_{rpm}), \tag{49}$$

$$i_{q12a,ref} = f_{q12a}(T_{o,req}, n_{rpm}), \text{ and} \tag{50}$$

$$i_{q12b,ref} = f_{q12b}(T_{o,req}, n_{rpm}). \tag{51}$$

Figure 5:
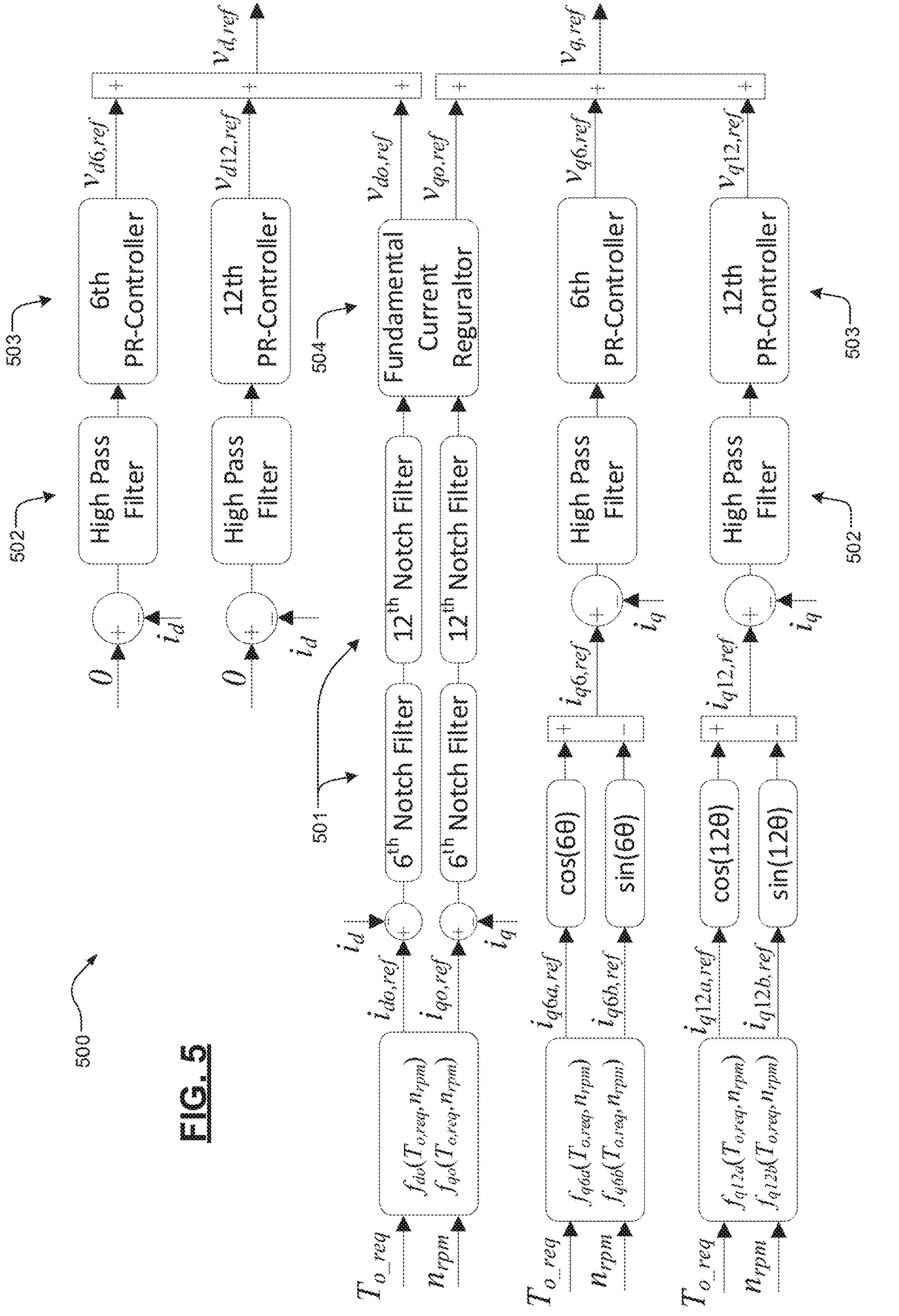
FIG. 5 is a functional block diagram of an example voltage control architecture for the synchronous electric motor using currents from optimized lookup tables according to the principles of the present application.

These 2D LUTs could be uploaded, for example, to the control system 140, and then utilized at block 306 to determine reference currents to control the electric motor. FIG. 5 illustrates a functional block diagram of an example voltage control logic or architecture 500 that utilizes the reference currents (e.g., the 2D LUTs) according to the principles of the present application. This includes the use of one or more current regulators (e.g., current regulator 504) and proportional-resonant (PR) controllers to control the harmonic currents.

Referring to FIG. 5, a reference q-axis current ($i_{q,ref}$) is calculated as the summation of a fundamental ($i_{qo,ref}$) and harmonic ($i_{q6,ref}$&$i_{q12,ref}$) currents as:

$$i_{q,ref}(\theta) = i_{qo,ref} + \underbrace{i_{q6a,ref}\cos(6\theta) - i_{q6b,ref}\sin(6\theta)}_{i_{q6,ref}} + \underbrace{i_{q12a,ref}\cos(12\theta) - i_{q12b,ref}\sin(12\theta)}_{i_{q12,ref}}. \tag{52}$$

Unlike the direct-axis (d-axis) current, it has only a fundamental value ($i_{do,ref}$) as its harmonic components are set to zero. The fundamental currents ($i_{qo,ref}$&$i_{do,ref}$) can be controlled by a fundamental current regulator 504 such as a proportional integral controller to output reference voltages ($v_{qo,ref}$&$v_{do,ref}$). The harmonic currents ($i_{g6,ref}$, $i_{q12,ref}$, and the zero d-axis harmonic currents) can be controlled by a harmonic current controller such as a proportional resonant controller 503 to output reference voltages ($v_{q6,ref}$, $v_{q12,ref}$, $v_{d6,ref}$, and $v_{dl2,ref}$). Notch filters 501 can be used with the fundamental current control to drop the harmonic components from the current error. High-pass filters 502 can be used with the control of the harmonic currents to drop the fundamental component from the current error.

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A torque ripple reduction system for an electrified powertrain of a vehicle, the torque ripple reduction system comprising:

a synchronous electric motor;

a control system configured to:

obtain look-up tables (LUTs) that each include harmonic currents that satisfy a constrained objective function for phase current magnitude for the synchronous electric motor;

based on a requested motor torque, determine, using the LUTs, a plurality of currents including fundamental direct and quadrature currents and $6^{th}$ order and $12^{th}$ order harmonic quadrature currents;

determine direct and quadrature voltages for the synchronous electric motor based on the plurality of currents including injection of the $6^{th}$ and $12^{th}$ order harmonic quadrature currents; and control the synchronous electric motor based on the determined direct and quadrature voltages to at least one of reduce torque ripples and increase efficiency of the synchronous electric motor;

an optimized system configured to determine the objective function and a set of constraints for the objective function and generate the LUTs by optimizing the objective function subject to the set of constraints.

2. The torque ripple reduction system of claim 1, wherein the objective function is defined as:

$$I_m = \sqrt{i_{do}^2 + i_{qo}^2 + i_{q6a}^2 + i_{q6b}^2 + i_{q12a}^2 + i_{q12b}^2},$$

where $I_m$ represents the phase current magnitude, $i_{do}$ and $i_{qo}$ represent the fundamental direct and quadrature currents, respectively, $i_{q6a}$ and $i_{q6b}$ represent cosine and sine Fourier coefficients, respectively, of the $6^{th}$ order harmonic quadrature current, and $i_{q12a}$ and $i_{q12b}$ represent cosine and sine Fourier coefficients, respectively, of the $12^{th}$ order harmonic quadrature current.

3. The torque ripple reduction system of claim 2, wherein the set of constraints include:

$$I_m \le I_{rated},$$

$$V_m \le V_{DC}/\sqrt{3},$$

$$T_{e,6} \le T_{6,thres} \text{ and } T_{e,12} \le T_{12,thres}, \text{ and}$$

$$T_{e,avg} = T_{o,req},$$

where $I_{rated}$ represents a rated phase current of the synchronous electric motor, $V_m$ represents a phase voltage magnitude relative to a direct current (DC) link or input voltage $V_{DC}$, $T_{e,6}$ and $T_{e,12}$ are $6^{th}$ order and $12^{th}$ order torque harmonic magnitudes relative to $6^{th}$ and $12^{th}$ order threshold torque harmonic magnitudes $T_{6,th}$ and $T_{12,th}$, and $T_{e,avg}$ is an average dynamic torque relative to a requested average torque $T_{o,req}$.

4. The torque ripple reduction system of claim 3, wherein the optimized system is further configured to define a speed range for the synchronous electric motor in which torque ripple reduction is required and, based on the defined speed range, determine a speed/torque transfer function for the synchronous electric motor that is utilized to determine the threshold torque harmonic magnitudes.

5. The torque ripple reduction system of claim 4, wherein the speed/torque transfer function H(s) is defined as:

$$H(s)=\frac{1/j}{(s+\beta/j)},$$

where j represents a moment of inertia of the synchronous electric motor, β represents a friction coefficient of the synchronous electric motor.

6. The torque ripple reduction system of claim 5, wherein $6^{th}$ and $12^{th}$ speed harmonics are assumed to equally contribute to root-mean-square (RMS) speed harmonics ($\omega_{rms}$), and wherein the $6^{th}$ and $12^{th}$ order threshold torque harmonic magnitudes $T_{6,thres}$ and $T_{12,thres}$ are calculated as follows to always keep the RMS of a speed ripple ($\Delta\omega_{rms}$) less than 5% of the average angular speed ($\omega_{avg}$):

$$\Delta\omega_{rms}=\sqrt{\omega_6^2+\omega_{12}^2}=\sqrt{2\omega_h^2}=\sqrt{2}\,\omega_h<0.05\omega_{avg}.$$

$$\text{where } \omega_{avg}=\frac{2\pi n_{rpm}}{60}.$$

$$\omega_n=0.035\frac{2\pi n_{rpm}}{60},$$

$$T_h=\omega_n\sqrt{(j2\pi f_h)^2+\beta^2},$$

$$T_{6,thres}=0.035\frac{2\pi n_{rpm}}{60}\sqrt{\left(j2\pi\frac{6Pn_{rpm}}{60}\right)^2+\beta^2},\text{ and}$$

$$T_{12,thres}=0.035\frac{2\pi n_{rpm}}{60}\sqrt{\left(j2\pi\frac{12Pn_{rpm}}{60}\right)^2+\beta^2},$$

where $n_{rpm}$ is a motor speed in revolution per minute and (P) is a pole pair of a synchronous electric motor.

7. The torque ripple reduction system of claim 1, wherein the LUTs are two-dimensional (2D) LUTs that define the harmonic currents as a function of motor speed and requested motor torque.

8. The torque ripple reduction system of claim 1, wherein the control system is configured to utilize a current regulator to determine the direct and quadrature voltages for the synchronous electric motor based on the plurality of currents.

9. A torque ripple reduction method for a synchronous electric motor of a vehicle, the torque ripple reduction method comprising:

obtaining, by a control system, look-up tables (LUTs) that each include harmonic currents that satisfy a constrained objective function for phase current magnitude for the synchronous electric motor;

based on a requested motor torque, determining, by the control system and using the LUTs, a plurality of currents including fundamental direct and quadrature currents and $6^{th}$ order and $12^{th}$ order harmonic quadrature currents;

determining, by the control system, direct and quadrature voltages for the synchronous electric motor based on the plurality of currents including injection of the $6^{th}$ and $12^{th}$ order harmonic quadrature currents;

controlling, by the control system, the synchronous electric motor based on the determined direct and quadrature voltages to at least one of reduce torque ripples and increase efficiency of the synchronous electric motor; and determining, by an optimized system, the objective function and a set of constraints for the objective function and generating, by the optimized system, the LUTs by optimizing the objective function subject to the set of constraints.

10. The torque ripple reduction method of claim 9, wherein the objective function is defined as:

$$I_m=\sqrt{i_{do}^2+i_{qo}^2+i_{q6a}^2+i_{q6b}^2+i_{q12a}^2+i_{q12b}^2},$$

where $I_m$ represents the phase current magnitude, $i_{do}$ and $i_{qo}$ represent the fundamental direct and quadrature currents, respectively, $i_{q6a}$ and $i_{q6b}$ represent cosine and sine Fourier coefficients, respectively, of the $6^{th}$ order harmonic quadrature current, and $i_{q12a}$ and $i_{q12b}$ represent cosine and sine Fourier coefficients, respectively, of the $12^{th}$ order harmonic quadrature current.

11. The torque ripple reduction method of claim 10, wherein the set of constraints include:

$$I_m\le I_{rated},$$

$$V_m\le V_{DC}/\sqrt{3},$$

$$T_{e,6}\le T_{6,thres}\text{ and }T_{e,12}\le T_{12,thres},\text{ and}$$

$$T_{e,avg}=T_{o,req},$$

where $I_{rated}$ represents a rated phase current of the synchronous electric motor, $V_m$ represents a phase voltage magnitude relative to a direct current (DC) link or input voltage $V_{DC}$, $T_{e,6}$ and $T_{e,12}$ are $6^{th}$ order and $12^{th}$ order torque harmonic magnitudes relative to $6^{th}$ and $12^{th}$ order threshold torque harmonic magnitudes $T_{6,th}$ and $T_{12,th}$, and $T_{e,avg}$ is an average dynamic torque relative to a requested average torque $T_{o,req}$.

12. The torque ripple reduction method of claim 11, further comprising defining, by the optimized system, a speed range for the synchronous electric motor in which torque ripple reduction is required and, based on the defined speed range, determining, by the optimized system, a speed/torque transfer function for the synchronous electric motor that is utilized to determine the threshold torque harmonic magnitudes.

13. The torque ripple reduction method of claim 12, wherein the speed/torque transfer function H(s) is defined as:

$$H(s)=\frac{1/j}{(s+\beta/j)},$$

where j represents a moment of inertia of the synchronous electric motor, β represents a friction coefficient of the synchronous electric motor.

14. The torque ripple reduction method of claim 13, wherein $6^{th}$ and $12^{th}$ speed harmonics are assumed to equally contribute to root-mean-square (RMS) speed harmonics ($\omega_{rms}$), and wherein the $6^{th}$ and $12^{th}$ order threshold torque harmonic magnitudes $T_{6,thres}$ and $T_{12,thres}$ are calculated as follows to always keep the RMS of a speed ripple ($\Delta\omega_{rms}$) less than 5% of the average angular speed ($\omega_{avg}$):

$$\Delta\omega_{rms} = \sqrt{\omega_6^2 + \omega_{12}^2} = \sqrt{2\omega_h^2} = \sqrt{2}\,\omega_h < 0.05\omega_{avg}.$$

$$\text{where } \omega_{avg} = \frac{2\pi n_{rpm}}{60}.$$

$$\omega_n = 0.035\,\frac{2\pi n_{rpm}}{60},$$

$$T_h = \omega_n\sqrt{(j2\pi f_h)^2 + \beta^2},$$

$$T_{6,thres} = 0.035\,\frac{2\pi n_{rpm}}{60}\sqrt{\left(j2\pi\frac{6Pn_{rpm}}{60}\right)^2 + \beta^2}, \text{ and}$$

$$T_{12,thres} = 0.035\,\frac{2\pi n_{rpm}}{60}\sqrt{\left(j2\pi\frac{12Pn_{rpm}}{60}\right)^2 + \beta^2},$$

where $n_{rpm}$ is a motor speed in revolution per minute and (P) is a pole pair of a synchronous electric motor.

15. The torque ripple reduction method of claim 9, wherein the LUTs are two-dimensional (2D) LUTs that define the harmonic currents as a function of motor speed and requested motor torque.

16. The torque ripple reduction method of claim 9, further comprising utilizing, by the control system, a current regulator to determine the direct and quadrature voltages for the synchronous electric motor based on the plurality of currents.

* * * * *